United States Patent [19]

Yagusic et al.

[11] Patent Number: 4,672,281
[45] Date of Patent: Jun. 9, 1987

[54] CONTROL FOR ELECTRIC MOTOR THAT DRIVES A ROBOTIC APPENDAGE

[75] Inventors: George J. Yagusic, Litchfield; Michael F. Durstin, Harwinton, both of Conn.

[73] Assignee: Durstin Machine & Manufacturing, Inc., Harwinton, Conn.

[21] Appl. No.: 786,462

[22] Filed: Oct. 10, 1985

[51] Int. Cl.$^4$ .............................................. G05B 11/18
[52] U.S. Cl. ................................... 318/592; 318/568; 318/562
[58] Field of Search .................. 318/592, 568 M, 562

[56] References Cited

U.S. PATENT DOCUMENTS 4,374,349 2/1983 Inaba et al. .................... 318/568

Primary Examiner—William M. Shoop, Jr.
Assistant Examiner—Saul M. Bergmann
Attorney, Agent, or Firm—McCormick, Paulding and Huber

[57] ABSTRACT

A control for an electric motor which drives a robotic appendage toward and into engagement with an object. In one embodiment, the control causes the robotic appendage to approach the object initially at a relatively high speed to expedite the work operation and then at a relatively low speed prior to impact to protect the object and the motor. A timer is used to determine when to alter the motor speed.

20 Claims, 5 Drawing Figures

CONTROL FOR ELECTRIC MOTOR THAT DRIVES A ROBOTIC APPENDAGE

BACKGROUND OF THE INVENTION

The invention relates generally to robotics and deals more particularly with a control for an electric motor which drives a robotic appendage such as an end effector toward and into engagement with an object, which control regulates the speed at which the appendage approaches the object and the force with which the appendage impacts and/or holds it.

One type of robotic appendage with which this invention is concerned is shown in German Pat. No. 28 51 961 to Stamcek et al and takes the form of a robotic hand used for gripping an object. The robotic hand comprises a body portion, two fingers pivotally mounted to the body portion as a pincer, and a reversible motor which drives the fingers toward or away from each other. Often the robotic hand is carried by a robotic arm which in turn may be supported by other robotic arms or by a robotic trunk, the arms and trunk provide means for moving the end effector in most any direction. The robot may be used to grasp and transport the objects of grasp a tool with which to work on them, for example, a nozzle of a hose leading from a source of spray paint.

To provide a system in which the aforedescribed robot functions rapidly, it is desirable that the robotic fingers converge upon and grip an object in a relatively short period of time. To this end, the motor may be driven at a high speed by a high voltage. However, a high voltage will cause the fingers to contact the object with a high force and many types of objects are fragile and may be damaged by the fingers under such conditions. For example, if the object is made of sheet material or thin, hard plastic or is a soft food item, it is possible for the fingers to mar, dent or even crush it. In addition to the harm done to the object, if the motor is powered by a high voltage and is stalled, the "back EMF" diminishes substantially and current surges through the motor, which current rapidly heats and may damage the motor.

In U.S. Pat. No. 3,477,007 to Ducommun et al, there is disclosed a control for a motor which drives a tool such as a screwdriver. When a screw engaged by the screwdriver is driven to its furthest extreme, the motor stalls and as a result, the back EMF of the rotor diminishes rapidly. Hence, the current through the motor increases rapidly, and the control senses the current increase. When the current exceeds a threshold level, the control triggers a circuit breaker which shuts off the current altogether to prevent overheating and to prevent further application of torque to the screwhead. Note that the screwdriver engages the screw head with a relatively large torque for a short time after the screw motion ceases.

Accordingly, a general aim of the invention is to provide a simple control for an electrically powered robotic appendage which control causes the appendage to rapidly approach an object but contact and/or hold it with a relatively moderate force to prevent damage to the object and to the motor.

A more specific aim of the invention is to provide a control of the foregoing type in which the robotic appendage approaches the object rapidly but slows down before impact.

Another specific aim of the invention is to provide a control of the foregoing types for a motor which drives pincer fingers of a robotic hand.

Still another specific aim of the invention is to provide a simple means for controlling the force by which a robotic appendage impacts an object and grips it if the robotic appendage takes the form of two or more pincer fingers.

SUMMARY OF THE INVENTION

The invention resides in a control for an electric motor which drives a robotic end effector, which control comprises a first electrical power means for driving the motor and a second electrical power means for driving the motor, the second power means driving the motor in the same direction as the first power means but at lower torque that the first power means. According to one feature of the invention, the control further comprises a means for coupling the first power means for a time to the motor to cause the end effector to move toward the object at a relatively fast rate and for decoupling the first power means from the motor and coupling the second power means to the motor later. The means for coupling and for decoupling includes a timing means for initiating the decoupling of the first power means and the coupling of the second power means during an interval which interval begins after the end effector begins to move toward the object under the influence of the first power means and which interval ends shortly after the end effector engages the object.

DETAILED DESCRIPTION OF THE PREFERRED EMBODIMENTS

Figure 1:
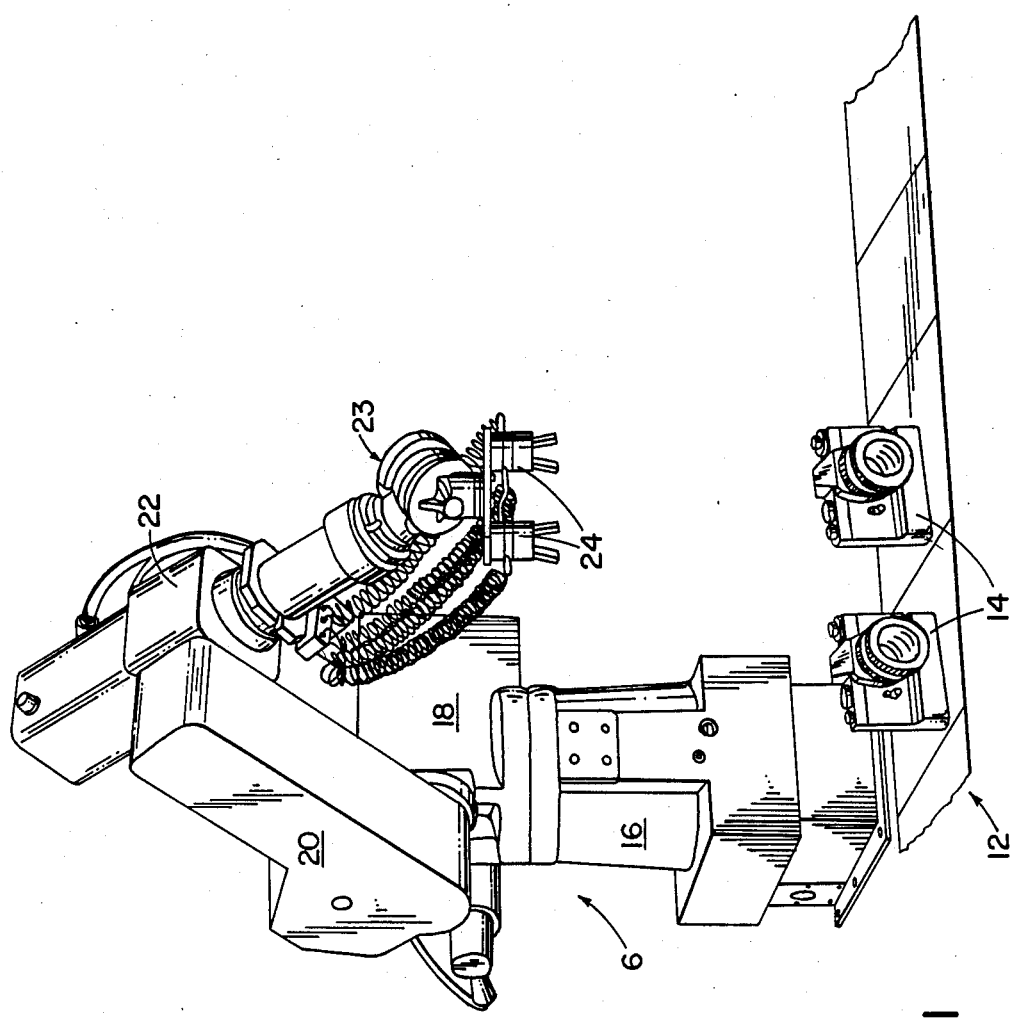
FIG. 1 is a perspective view of a robotic system including a robot and a conveyor which transports objects to and from the robot.
Figure 1:
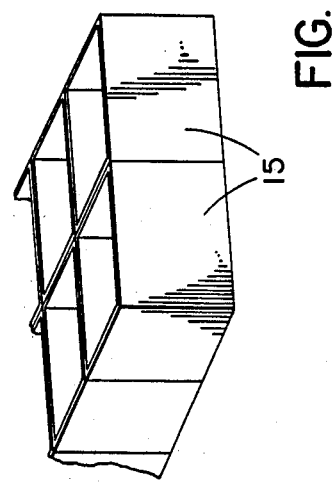

FIG. 1 illustrates a robot generally designated 6 in which the invention is embodied, and a conveyor 12 for transporting objects 14,14 to and from the robot. The robot 6 comprises a stationary base portion 16, a trunk portion 18 mounted thereon for rotation about a vertical axis, an arm portion 20 mounted to the trunk portion 16 for rotation about a horizontal axis, an arm portion 22 carried by the arm portion 20 and mounted thereto for rotation about another horizontal axis, a three roll wrist portion 23 carried by the free end of the arm portion 22, and end effectors 24,24 carried by the wrist portion 23. Electric motors are used to move the trunk and arm portions about their respective axes which motors are under computer control. For a further description of the trunk, arm and wrist portions of such a robot, reference may be made to a Model T$^3$726 Robot manufactured by Cincinnati Milacron of Ohio.

Because the base portion on the robot 6 is stationary, objects are carried to the robot by the conveyor 12 which objects, by way of example, take the form of fragile cameras. The robot is a multi-purpose apparatus and may be used to remove the cameras from the conveyor and deposit them in boxes 15, 15 for shipping. To remove an object from the conveyor, the computer must first know or learn the approximate location of the object. This information can be obtained by electronic eyes (not shown) mounted in the robot or from a knowlege of the location of the objects 14, 14 relative to the conveyor and communications from a controller of the conveyor by which the robot is able to track the motion of the conveyor and so, the motion of the objects 14, 14 carried by it.

After the robot decides upon a camera 14 to remove from the conveyor, the computer activates the appropriate motors of the trunk, arm, and wrist portions to position one of the end effectors 24,24 such that the camera is located between the associated fingers. Only one end effector is used to grasp the camera because of the camera's small size. Next, the fingers are driven by a motor 31 (FIG. 2) to converge upon the camera and ultimately grip it as discussed in more detail below. Next, appropriate motors of the trunk, arm, and wrist portions are activated to lift the camera and transport it to a position within one of the boxes 15. Finally, the hand 24 is opened to release the camera and the appropriate motors of the trunk, arm, and wrist portions are activated to move the hand from the vicinity of the box 15 back to the conveyor to repeat the cycle.

Figures 2, 4:
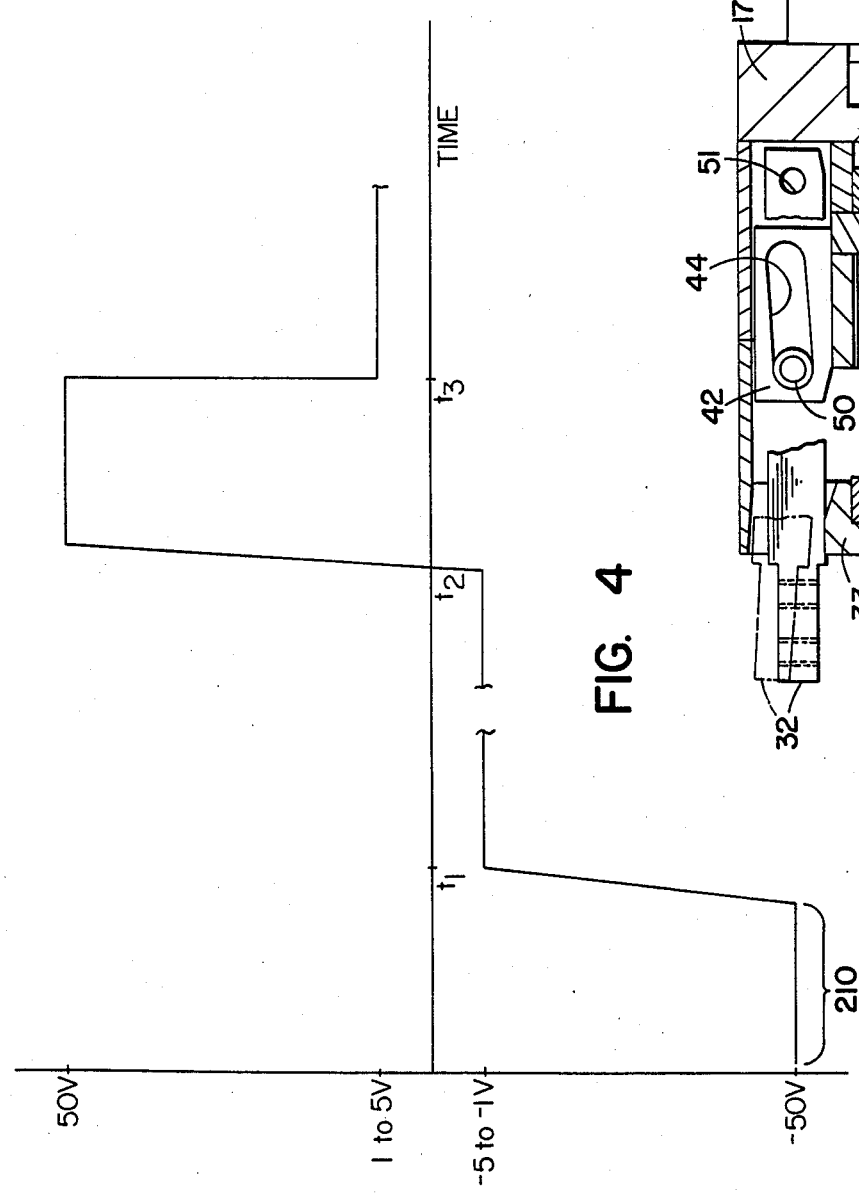
FIG. 2 is a cross-sectional view of a robotic hand of the robot of FIG. 1.
FIG. 4 is a timing diagram for the circuit of FIG. 3.

As shown in FIGS. 1 and 2, the end effectors 24, 24 take the form of robotic hands: however, it should be understood, that other types of robotic appendages can be driven by the motor 31 under the control of a control circuit 65 described in more detail below. Each of the robotic hands 24, 24 comprises a housing 30, a reversible DC motor 31 mounted to a backplate 16 of the housing, two fingers 32, 32 pivotally mounted within the housing in spaced relation to one another and protruding outwardly through a front plate 33 of the housing, and a mechanism 37 for coupling the motor to the fingers. The coupling mechanism 37 comprises a lead screw 34 fixedly attached to and driven by a motor shaft 40, an embracing nut 36 threadably received by the lead screw and driven into axial motion by rotation of the motor and lead screw, and cams or guides 42, 42. Each of the guides 42 comprises a small rectangular plate having a slot 44 which is angled inwardly from the adjacent side of the housing and is fixedly attached to the embracing nut 36. A pin 50 is fixedly attached to a side of each finger 32, protrudes into the slot 44 and is guided by it. Each of the fingers 32,32 pivots about another pin 51 which other pin is mounted rearwardly of the guide 42 and oriented parallel to the pin 50. When the motor is turned in a reverse direction, the embracing nut and the guide are moved forwardly causing the fingers to pivot outwardly, diverging from one-another. Alternately, when the motor is turned in a forward direction, the embracing nut and the guide are moved rearwardly causing the fingers to pivot towards one another, converging upon an object 14 when located between the two fingers 32, 32. In broken lines, FIG. 2 illustrates the fingers in the divergent positions, and in solid lines, FIG. 2 illustrates the fingers in the convergent position. The fingers 32, 32 are located in their divergent position when the control circuit is deactivated and are driven toward one another when it is activated.

Figure 3:
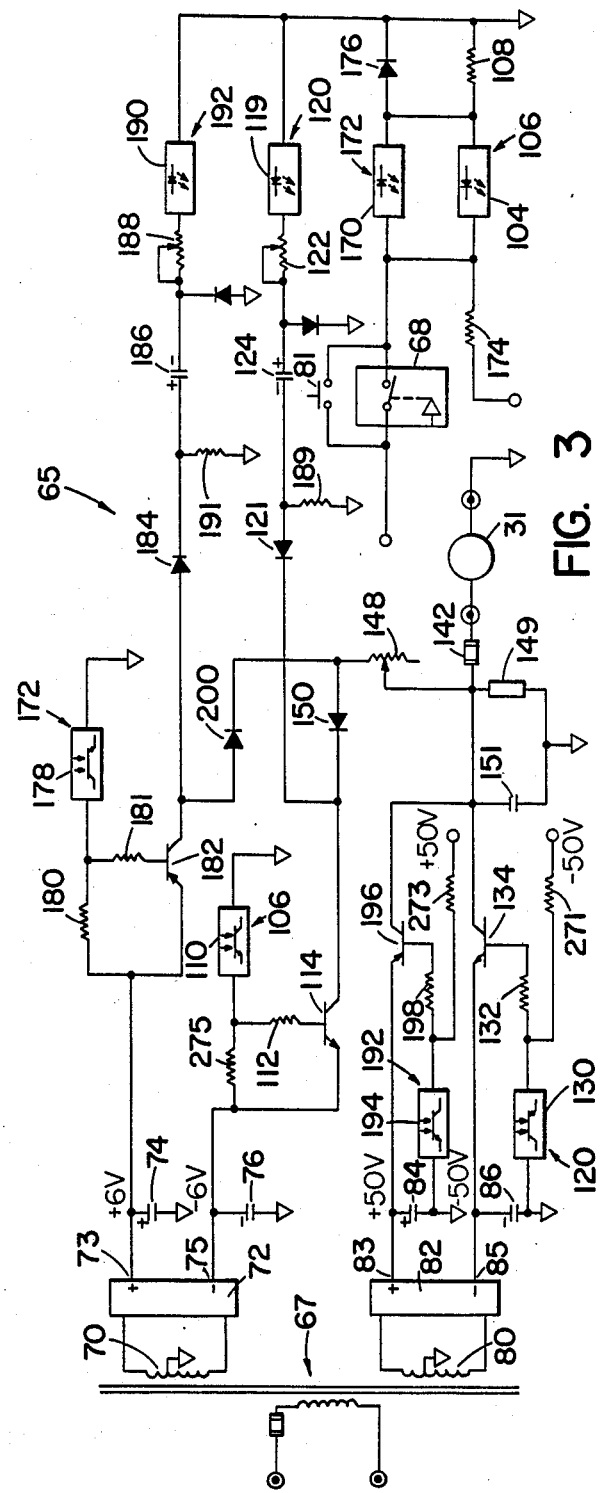
FIG. 3 is a circuit diagram of an electrical control for a motor which drives the robotic hand of FIG. 2.

FIG. 3 illustrates the control circuit 65 for the motor 31. The circuit 65 includes a transformer 67 having a center tapped secondary winding 70 which steps down line voltage and applies it to a full wave rectifying bridge 72 to yield sources 73 and 75 of two relatively small voltages, by way of example, +6 volts DC and −6 volts DC, respectively. The transformer 67 also has another center tapped secondary winding 80 which steps down the line voltage to a lesser extent and applies it to another full wave rectifying bridge 82 to yield sources 83 and 85 of two relatively large voltages, by way of example, +50 volts DC and −50 volts DC, respectively. Capacitors 74 and 76 stablize the sources 73 and 75 of +6 volts DC and −6 volts DC, respectively and capacitors 84 and 86 stabilize the sources 83 and 85 of +50 volts DC and −50 volts DC, respectively.

The circuit 65 further includes a solid state switch 68 by which the computer activates and deactivates the control circuit 65. A normally open, manually operated switch 81 is also provided for test purposes. When activated, the −6 volt source is applied to the cathode of a light emitting diode portion 104 of an optical coupler 106 causing a current to flow from ground, through a current limiting resistor 108, through the light emitting diode portion 104 and into the source of the −6 volts, which current activates the optical coupler 106. As a result, an associated light sensitive transistor portion 110 is activated and causes current to flow from ground, through it, through a resistor 112, through the base to emitter junction of an NPN transistor 114 and into the source of −6 volts DC. Hence, the transistor 114 is activated and causes a current to flow from ground, through a light emitting diode portion 119 of an optical coupler 120, a potentiometer 122, a capacitor 124, a diode 121, and the collector to emitter junction of the transistor 114 and into the source of −6 volts. Hence, a photosensitive transistor portion 130 of the optical coupler 120 is activated and causes a current to flow from ground, through it, through a resistor 132, through the base to emitter junction of an NPN power transistor 134 and into the source of −50 volts DC. Consequently, the transistor 134 is activated and causes a relatively large DC current to flow from ground, through the armature of the DC motor 31, a fuse 142, and the collector to emitter junction of the transistor 134 and into the source of −50 volts DC.

This relatively large current causes the motor to develop a relatively high torque and rotate the lead screw 34 relatively rapidly in a forward direction. As the lead screw turns, the embracing nut 36 moves rearwardly at a relatively rapid rate forcing the robotic fingers to move towards one another and the object 14 relatively rapidly. At this time also, a diode 150 which is connected between the transistor 114 and the transistor 134 is reversed biased so that the source of −6 volts DC is not applied to the motor 31.

As the large current flows through the motor 31 and into the source of −50 volts DC, the capacitor 124 charges because both the optical coupler 120 and the transistor 114 are active, and when the magnitude of the voltage of the capacitor reaches approximately 4.2 volts, the current through the light emitting diode portion 119 of the optical coupler 120 is terminated. The capacitor 124 and the potentiometer 122 form a variable timer, and the time that it takes for the capacitor 124 to charge to the threshold level of 4.2 volts is established by the magnitude of the capacitor 124 and the effective resistance of the potentiometer 122 which time, by way of example, is 100 milliseconds. After the 100 millisecond interval, the associated photosensitive portion 130 turns off and shuts off the transistor 134. Hence, the current path from ground, through the motor 31 and to the source of −50 volts DC is blocked.

Nevertheless, the transistor 114 remains on because the optical coupler 106 is still activated, and causes a relatively small current to flow from ground, through the armature of the motor 31, the fuse 142, a potentiometer 148, the diode 150, and the collector to emitter junction of the transistor 114, and into the source 75 of −6 volts DC. The magnitude of this relatively small current is regulated by the potentiometer 148, and a transient suppressor component 149 and a capacitor 151 minimize the transient, inductive voltage spike of the motor 31 armature. Considering the voltage drops across the diode 150 and the transistor 114, a maximum of 5 volts DC of negative polarity is applied to the motor at this time. Therefore, the current through the motor is significantly less than the current delivered to it previously by the source of −50 volts via the transistor 134, and the motor is driven at substantially lesser torque.

By way of example, the values of the capacitor 124 and the associated current limiting resistor 122 are such that the source of −50 volts is applied to the motor for enough time to allow the robotic fingers to travel approximately half way to the object 14 at a rapid rate. Then, the lesser voltage is applied to the motor to cause the fingers to slow in their approach to the object 14 and to contact it with a relatively small force. It should also be noted that the motor rotar and drive shaft, the lead screw 34, the embracing nut 36 and the robotic fingers 32,32 have a sizeable inertia which continues to drive the fingers toward the object for a short period after the −50 volts is removed from the motor 31 so that the fingers approach the object at a greater speed than that which would be developed by the lesser voltage alone. The switching of voltage is caused after the fingers have travelled only one half the way to provide time for the momentum to dissipate before the fingers contact the object.

For some applications the speed of closing the robotic hand 24 is very important and/or the object being grasped can withstand a significant impact by the finger 32,32 in which case the value of the capacitor 124 and/or the setting of the potentiometer 122 may be increased to effect the transition from −50 volts to a lesser voltage in the range −1 to −5 volts shortly after impact. One reason for switching to the lower voltage at all in this application is to prevent subsequent overheating of the motor 31 due to it being in the stalled condition and exhibiting, little "back EMF".

For other applications, speed of operation is not as important as protection of the object 14 from harmful impact. In which case, the relatively low voltage of negative polarity can be applied to the motor 31 in place of the relatively high voltage of negative polarity shortly after the robotic fingers 32, 32 are set into motion by the relatively high voltage. The relatively high voltage is used to overcome the zero momentum of the fingers 32, 32, lead screw 34 and motor shaft 40.

It should also be noted that because the high voltage is applied to the motor for a relatively short period of time in general, it is possible and often advantageous to utilize a high voltage which is greater than the rated voltage of the motor. The higher than rated voltage provides a faster response of the motor and finger 32,32, yet it is applied for too short a period to harm the motor.

After impact, the robotic fingers 32,32 grip the object 14 with a force resulting from the voltage in the range −1 to −5 volts, which voltage is determined by the setting of the potentiometer 148 and which force is large enough to hold the object 14 while it is being carried to the box (or to hold a tool which works upon the object if that is the use of the robot) but small enough to prevent damage to the object (or the tool as the case may be) and to prevent adverse heating within the motor 31 due to the fact that the motor 31 is impeded and the "back EMF" has decreased.

Next, the robot 10 transports the object 14 to the desired location by appropriate movement of the robotic trunk and arm portions, which in the illustrated case, is a position within the boxes 15. Next, the computer deactivates the solid state switch 68 to cause the robot to release the object. When the solid state switch 68 is deactivated, the light emitting diode portion 104 of the optical coupler 106 becomes reverse biased shutting off the transistor 114 and causing a light emitting diode portion 170 of an optical coupler 172 to become forward biased by the source of +6 volts and a current which flows through a resistor 174, the light emitting diode portion 170, and a diode 176 and then, to ground. As a result, an associated light sensitive portion 178 of the optical coupler 172 is activated and causes current to flow from the source 73 of +6 volts DC, through an emitter to base junction of a PNP transistor 182, and a resistor 181, and to ground activating the transistor 182, and also causes current to flow from the source of +6 volts, through the emitter to collector junction of the transistor 182, a diode 184, a capacitor 186, a potentiometer and a light emitting diode portion 190 of an optical coupler 192 and to ground. Consequently, a light sensitive portion 194 of the optical coupler 192 is activated and causes a current to flow from the source of +50 volts DC, through the emitter to base junction of a PNP transistor 196, through a resistor 198, through the light sensitive portion 194 and to ground. This current activates the transistor 196 and causes a relatively large current to flow from the source of +50 volts DC, through the emitter to collector junction of the transistor 196, and the fuse 142 and into the motor 31. This relatively large current develops a relatively large, reverse torque on the motor 31 drive shaft and causes the lead screw 34 to turn in the reverse direction, the embracing nut 36 to move outwardly and the fingers 32, 32 to diverge from the object 14 and from one another at a relatively fast rate. Hence, the robotic hand 24 releases the object 14 and thereby deposits it in the box.

At this time, the transistor 182 is also activated as discussed above; however, a diode 200 connected between the transistor 182 and the transistor 196 is reversed biased to prevent the application of +6 volts DC to the motor 31. As the large current flows from the source of +50 volts DC into the motor 31 via the transistor 196, another current also flows from the source of +6 volts DC into the capacitor 186, which current causes the capacitor 186 to progressively charge, and when the magnitude of the voltage of the capacitor reaches approximately 4.2 volts, the light emitting diode portion 190 of the optical coupler 192 becomes reversed biased, and shuts off the associated light sensitive portion 194 and the transistor 196. Hence, the relatively large, reverse current to the motor terminates.

Nevertheless, the transistor 182 remains on and conducts a relatively small current from the source of +6 volts DC, through the diode 200, the potentiometer 148, the fuse 142 and the motor 31. Considering the voltage drop across the transistor 182 and the diode 200, a maximum of approximately +5 volts DC is applied to the motor. Hence, the current through the motor now is significantly less than that which was delivered through the transistor 196, the precise amount of the relatively small current being determined by the setting of the potentiomter 148. This lesser voltage establishes a moderate torque by which the motor 31 reversibly drives the robotic fingers 32, 32 further away from the object 14. Note that the motor 31 stalls when the embracing nut 36 and the guides 44, 44 are fully withdrawn, at which position, the pins 50, 50 prevent further movement of the guides 44, 44 and the embracing nut 36. The relatively low magnitude of the source 73, and the existence of the potentiometer 148 limit the current which can flow through the motor 31 and thereby prevent excessive heating and damage to the motor.

The magnitude of the capacitor 186 and the effective resistance of the potentiometer 188 determine the time at which the relatively high voltage and current are replaced by the relatively low voltage and current and, by way of example, the value of the capacitor 186 and the setting of the potentiometer 188 are such that the +50 volts is applied to the motor for enough time to allow the robotic fingers 32,32 to travel approximately half the way from the object to the stalled position. Then, the lesser voltage is applied. It should also be noted that the inertia of the motor drive shaft, the lead screw 34, the embracing nut 36, and the robotic fingers 32,32 cause the robotic fingers to travel at a relatively high speed away from the object for a short time after the +50 volts DC is withdrawn, but much of this momentum is dissipated before the fingers reach their final resting position and, whatever momentum remains, is not harmful because the robotic hand is constructed of durable materials to resist the impact.

As discussed above, for some applications the speed of operating the robotic hand 24 is very important in which case the value of the capacitor 186 and/or the setting of the potentiometer 188 can be increased to effect the transition from +50 volts to the voltage in the range +1 to +5 volts shortly after impact, the lower voltage preventing overheating of the motor.

The motor 31 and the fingers 32,32 remain in this stalled, waiting position until the robot 10 is ready to grasp another object or perform some other task utilizing the robotic hand 24.

Note that while the solid state switch 68 is deactivated, the capacitor 124 discharges through a resistor 189 to be prepared for the next cycle, and likewise when the solid state switch 6B is reactivated, the capacitor 186 discharges through a resistor 191. Also, resistor 271,273,275, and 180 legs prevent inadvertant turn on of transistors 134,196,114 and 182, respectively due to leakage currents through the respective light sensitive transistor portions.

FIG. 4 shows a graph of the voltage applied to the motor as a function of time to illustrate the aforedescribed process for grasping the object and subsequently releasing it. From time zero to time equals t1, the relatively large, −50 volts is applied to the motor to cause the robotic fingers 32, 32 to approach the object at a relatively fast rate. At approximately time equal t1, the voltage in the range −1 to −5 volts DC is applied to the motor to cause the robotic fingers 32, 32 to approach the object at a reduced rate. Then, during the time t1–t2 the robotic hand grips the object 14 and the robot 10 moves the robotic hand 24, 24 and the object 14 it holds by means of the trunk and arm portions to a position within the box. The relatively small negative voltage causes the robotic fingers 32,32 to grip the object with a moderate, holding force. At approximately time equals t1, the optical coupler 68 is deactivated causing the +50 volts to be applied to the motor and the fingers 32,32 to diverge rapidly from the object, thereby releasing the object 14. Finally, at time t3 the relatively small voltage in the range +1 to +5 volts is applied to the motor to cause the robotic fingers 32,32 to diverge at a relatively moderate rate and ultimately reach the stalled condition.

Figure 5:
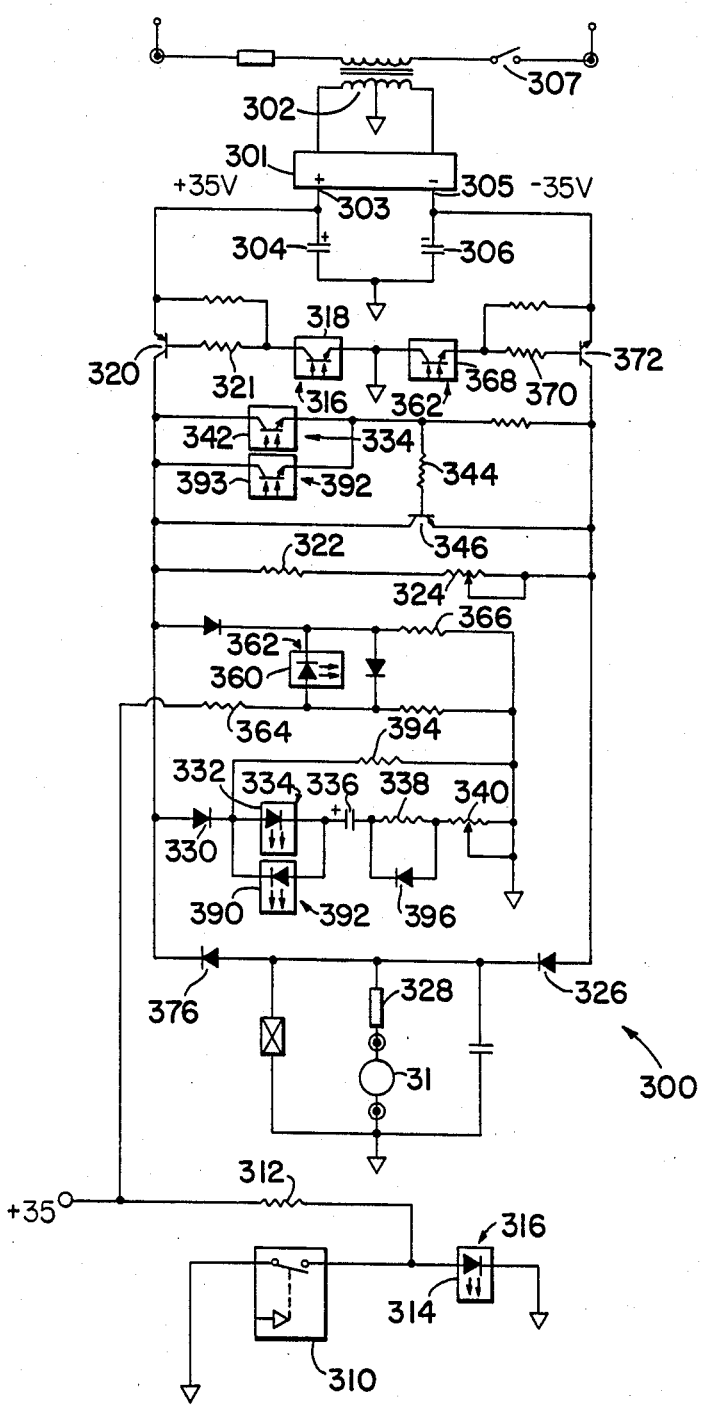
FIG. 5 is a circuit diagram of another electrical control which may be used to drive the robotic hand of FIG. 2.

FIG. 5 illustrates another control circuit generally designated 300 which can substitute for the control circuit 65 to control the robotic hand 24. The control circuit 300 includes a single, center tapped transformer 302 and a full wave rectifying bridge 301. Power is applied to the transformer 302 creating sources 303 and 305 of relatively high voltages of opposite polarity at the outputs of the bridge 305. By way of example, the relatively high voltages are +35 volts DC and −35 volts DC respectively, which voltages are stabilized by capacitors 304 and 306 respectively.

The source 303 of +35 volts is applied via a resistor 312 to a light emitting diode portion 314 of an optical coupler 316 to activate it. Consequently, an associated light sensitive portion 318 is activated and conducts current from the source 303 of +35 volts, through the emitter to base junction of a PNP transistor 320 and a resistor 321 and into ground. This current activates the transistor 320 and causes another current to flow from the +35 volt source, through the emitter to collector junction of the transistor 320, a diode 330, a light emitting diode portion 332 of an optical coupler 334, a capacitor 336, a resistor 338 and a potentiometer 340 and into ground. This current charges the capacitor 336, to a level of approximately 33 volts (discussed in more detail below). In addition, once the capacitor is charged to this level, a relatively small current flows to the motor from the +35 volt source, through the emitter to collector junction of the transistor 320, a resistor 322, a potentiometer 324, a diode 326 and a fuse 328, which current maintains the motor in a reverse, holding condition in which the fingers 32,32 are spread apart to their limits.

When the robot 10 has positioned the robotic hand 24 around the object 14 the computer sends a signal to a solid state switch 310 activating it and thereby grounding the anode of light emitting diode portion 314. Hence, the light emitting diode portion 314 of the optical coupler 316 shuts off and the optical coupler 316 shuts off. Simultaneously, the +35 volts from the source 303 is applied via a resistor 364 to a light emitting diode portion 360 of an optical coupler 362 to activate it and cause a current to flow from ground, through an associated light sensitive portion 368, a resistor 370 and the base to emitter junction of an NPN transistor 372 to the source 305 of −35 volts DC. This current activates the transistor 372 as discussed below.

Simultaneously, the capacitor 336 discharges through a light emitting diode porton 390 of an optical coupler 392, a resistor 394, the potentiometer 340 and a diode 396 activating the optical coupler 392 and causing an associated light sensitive portion 393 to conduct current from ground, through the armature of the motor 31, the fuse 328, the diode 376, itself, the resistor 344, the base to emitter junction of an NPN transistor 346, and the collector to emitter junction of the transistor 372 to the source of −35 volts. This current activates the transistor 346 and causes a relatively large current to pass from ground, through the armature of the motor 31, the fuse 328, the diode 376, the collector to emitter junction of the transistor 346 and the collector to emitter junction 372 to the source of −35 volts. This relatively large current drives the motor 31 in a forward direction with a relatively high speed and at a relatively high torque causing the robotic fingers 32,32 to converge upon the object 14 rapidly. Simultaneously, a relatively small current flows from ground, through the motor 31, through the fuse 328, the diode 376, the resistor 322, the potentiometer 324 and the collector to emitter junction of the transistor 372, which resistor 322 and potentiometer 324 significantly limit the current.

The capacitor 336 discharges to nearly zero volts after a time so that it ceases to activate the optical coupler 392, and as a result, the transistor 346 shuts off and the remaining current flow through the motor 31 is essentially that which flows through the resistor 322 and the potentiometer 324 which current causes the robotic fingers 32,32 to converge upon the object at a relatively slow rate. In the control circuit 300, the time during which the relatively high current is applied from the −35 volt source to the motor is determined by the size of the capacitor 336, the resistor 394, and the effective resistance of the potentiometer 340. By way of example, these components are specified at 15 microfarads, 7.5 kilohms, and 0-20 kilohms, and the potentiometer 340 is set such that the relatively high voltage is shut off at a time when the robotic fingers 32, 32 have traveled approximately half way between their most spread position and their contact position with the object 14. However, if desired the aforesaid components can be selected such that the transition occurs any time after the fingers 32,32 begin to converge under the influence of the high voltage or even shortly after contact with the object 14. If the current limitation occurs before contact, then the current limitation lessens the force of impact and prevents subsequent overheating of the motor, and if the current limitation occurs shortly after impact, then it protects the motor from prolonged heating.

Next, the robot moves the hand 24 and the object 14 it holds toward the box and when it reaches it, the computer sends a signal to deactivate the solid state switch 310. Consequently the +35 volts is applied via the resistor 312 to the light emitting diode portion 314 of the optical coupler 316 activating it and the associated light sensitive portion 318. As a result, a current flows from the source of +35 volts, through the emitter to base junction of the PNP transistor 320, the base resistor 321, and the light sensitive portion 318 and into ground. This current activates the transistor 320 and causes current to flow from the source of +35 volts DC, through the emitter to collector junction of the transistor 320, the diode 330, the light emitting diode portion 332 of the optical coupler 334, the capacitor 336, the resistor 338 and the potentiometer 340 and into ground. This current gradually charges the capacitor 336 and activates the optical coupler 334 and thereby causes another current to flow from the source 303 of +35 volts, through the emitter to collector junction of the transistor 320, a light sensitive portion 342 of the optical coupler 334, a resistor 344 and the base to emitter junction of the NPN, power transistor 346. This current activates the transistor 346 and cause a relatively high current to flow from the +35 volt source, through the collector to emitter junction of the transistor 320, the collector to emitter junction of the transistor 346, the diode 326, the fuse 328 and the motor 31, and into ground. This relatively large current from the source of +35 volts DC drives the motor at a relatively high speed and high torque in the reverse direction so that the robotic fingers 32,32 diverge from one another and release the object 14. Simultaneously, a relatively small current flows from the +35 volt source, through the emitter to collector junction of the transistor 320, the resistor 322, the potentiometer 324, the diode 326 and into the motor 31, adding to the relatively large current discussed above.

Meanwhile, the capacitor 336 continues to charge, which charging rate is determined by the magnitude of the capacitor 336, the magnitude of the resistor 338 and the effective resistance of the potentiometer 340. After the voltage of the capacitor 336 reaches a threshold level, approximately 33 volts in the illustrated embodiment, the light emitting diode 332 of the optical coupler 334 becomes reversed biased and shuts off. Consequently, the light sensitive portion 342 and the transistor 346 shut off and the current to the motor 31 is greatly reduced; it now results predominantly from that which flows through the resistor 322 and the potentiometer 324. Hence, the robotic fingers 32,32 are now driven with a relatively small force in divergent directions.

In the illustrated embodiment, the voltage applied to the motor 31 is switched from the relatively high, +35 volt level to the relatively low level at the time that the robotic fingers 32,32 have traveled approximately half way from the object to their divergent, hold position although this need not always be the case. If desired, the time constant of the resistor 394 and potentiometer 340/capacitor 336 can be increased to cause the high current to shut off after the fingers are fully withdrawn to increase the speed at which the robotic hand 24 opens to its fullest extreme yet prevent prolonged heating of the motor.

After the robotic hand 24 has released the object 14, the robot 10 moves the hand 24 back to the conveyor 12 to grasp another object and begin another cycle of operation.

By the foregoing, control circuits for a motor which drives a robotic appendage have been disclosed. However, numerous modifications and substitutions may be made without deviating from the scope of the invention. For example, the voltages which drive the motor 31 can be varied according to the requirements of the motor 31 and the application of the robotic hand 24. Also, if desired manual switches or standard transistors can substitute for the solid state relays 68 and 310, and standard transistors can substitute for the various optical couplers disclosed above. Furthermore, if desired, timers, other than the resistance/capacitor ones described above, can be utilized. Also, if desired, the control circuits can be used with a motor which drives a robotic hand having one stationary finger and another finger which is movable relative to it. In addition, if desired a delay circuit may be included in either of the circuits 65 or 300 to cause the relatively low voltage to be applied to the motor 31 a short time after the corresponding, relatively high voltage is removed to allow the momentum of the fingers and motor shaft to dissipate before the motor receives additional power from the source of the relatively low voltage. This dissipation period naturally helps to decrease the speed at which the fingers 32, 32 approach the object 14 and the force of the subsequent impact with the object 14. The dissipation period may extend until shortly before or shortly after the fingers contact the object 14. If desired also, a resistor may be placed in parallel with each of diodes 201 and 203 in the circuit 65. Therefore, the invention has been disclosed by way of example and not by limitation.

We claim:

1. A control for a robotic apparatus having an electric motor and an end effector driven by said motor to engage an object, said control comprising:

a first electrical power means for driving said motor, a second electrical power means for driving said motor, said second power means driving said motor in the same direction as said first power means but at lower torque than said first power means, and means for coupling said first power means for a time to said motor to cause said end effector to move toward said object and for decoupling said first power means from said motor and coupling said second power means to said motor later, said means for coupling and for decoupling including a timing means for initiating the decoupling of said first power means and the coupling of said second power means before said end effector engages said object.

2. A control as set forth in claim 1, wherein said first power means comprises means for applying voltage to said motor and said second power means comprises means for applying voltage to said motor, said voltage applied by said second power means being less than said voltage applied by said first power means but sufficient to cause said end effector to continue moving toward said object.

3. A control as set forth in claim 2 wherein said voltage of said first driving means is approximately constant most of the time that it is applied to said motor and said voltage of said second power means is approximately constant most of the time that it is applied to said motor.

4. A control as set forth in claim 2 further comprising means for varying the voltage applied to said motor by said second power means.

5. A control as set forth in claim 1 wherein said timing means includes means for varying the time during which said first power means is coupled to said motor before said second power means is coupled to said motor.

6. A control as set forth in claim 1 wherein said timing means includes a capacitor and means for progressively changing the voltage of said capacitor while said first power means is coupled to said motor and wherein said means for decoupling said first power means from said motor and coupling said second power means to said motor is initiated when the voltage of said capacitor reaches a predetermined level.

7. A control as set forth in claim 1 further comprising:

a third electrical power means for driving said motor in the opposite direction as said first and second power means, a fourth electrical power means for driving said motor in the opposite direction as said first and second power means, said fourth power means driving said motor at lower torque than said third power means, and wherein, said means for initiating the coupling of said first power means and the decoupling of said second power means includes means for initiating decoupling of said second power means from said motor and coupling of said third power means to said motor while said end effector engages said object to cause said end effector to move away from said object, and for initiating decoupling of said third power means from said motor and coupling of said fourth power means to said motor later to reduce drive current through said motor.

8. A control as set forth in claim 7 wherein said first power means comprises means for applying voltage to said motor, said second power means comprises means for applying voltage to said motor, said voltage applied by said second power means being less than said voltage applied by said first power means said third power means comprises means for applying voltage to said motor and said fourth power means comprises means for applying said voltage applied by said fourth power means being less than said voltage applied by said third power means.

9. A control as set forth in claim 1 wherein said initiation of said decoupling of said first power means and said coupling of said second power means occurs shortly after said end effector engages said object.

10. A robotic apparatus for gripping an object, said apparatus comprising:

an end effector including at least two fingers movable relative to one another, a motor for effecting relative movement of said fingers toward one another, a first source of voltage for driving said motor, said voltage being approximately constant during most of the time that it is applied to said motor, a second source of voltage for driving said motor, the voltage of said second source being less in magnitude than the voltage of said first source, being the same polarity and being approximately constant during most of the time that said second voltage is applied to said motor, and means for applying the voltage of said first source for a time to said motor to effect relative finger movement toward one-another and for applying the voltage of said second source to said motor at a later time before said fingers contact said object to cause said fingers to contact said object with a lesser force.

11. A robotic apparatus as set forth in claim 10 wherein said means for applying the voltages comprises a timer which initiates the application of the voltage of said second source to said motor.

12. A robotic apparatus as set forth in claim 11 wherein said timer comprises a capacitor, and means for progressively changing the voltage of said capacitor while the voltage of said first source is applied to said motor, and wherein said means for applying the voltage of said second source at said later time is initiated when the voltage of said capacitor reaches a predetermined level.

13. A robotic apparatus as set forth in claim 10 wherein said motor is reversible and said end effector further comprises a lead screw means for coupling said lead screw to said motor, an embracing nut threadably received by said lead screw for reciprocal movement by said motor, said fingers being coupled to said embracing nut so that when said lead screw turns in one direction said fingers move toward one another and when said lead screw turns in the opposite direction said fingers move away from one another.

14. A robotic apparatus as set forth in claim 13 wherein said first and second sources of voltage drive said motor forwardly, and further comprising a third source of voltage for reversibly driving said motor, a fourth source of voltage for reversibly driving said motor, the voltage of said fourth source being less in magnitude than the voltage of said third source, and means for applying the voltage of said third source to said motor to cause said fingers to move away from each other and for applying the voltage of said fourth source to said motor in place of the voltage of said third source at a later time.

15. A robotic apparatus as set forth in claim 10 wherein said motor is a D.C. motor.

16. A robotic apparatus for gripping an object, said apparatus comprising:

an end effector including at least two movable fingers, a motor for moving said fingers toward one another, a first source of voltage for driving said motor in one direction, a second source of voltage for driving said motor in said direction, the voltage of said second source being less in magnitude than the voltage of said first source, and means for applying the voltage of said first source to said motor to cause said fingers to move toward one another and for applying the voltage of said second source to said motor in place of the voltage of said first source while said fingers contact said object whereby to cause said end effector to grip said object with a lesser force.

17. A robotic apparatus as set forth in claim 16 further comprising a timer which initiates the application of the voltage of said second source to said motor.

18. A method for engaging an object with a robotic apparatus having an end effector, said end effector having a movable appendage and said movable appendage being driven by a motor, said method comprising the steps of:

applying a first, relatively high voltage to said motor for a predetermined time to cause said appendage to approach said object at a relatively high speed, and after said predetermined time, applying a second, relatively low voltage to said motor to cause said appendage to approach said object at a lesser speed.

19. A method as set forth in claim 18 further comprising the step of:

applying a third, relatively high voltage of opposite polarity than that of said first, relatively high voltage to said motor after said appendage has engaged said object to cause said appendage to disengage said object and move away from it.

20. A method as set forth in claim 19 further comprising the step of applying a fourth, relatively low voltage of opposite polarity than that of said second, relatively low voltage to said motor to replace said third relatively high voltage.

* * * * *